United States Patent Office 3,687,698
Patented Aug. 29, 1972

3,687,698
NONWANDERING HARDENING COMPOUNDS
AND THEIR USE
Hyman L. Cohen, Rochester, N.Y., assignor to Eastman
Kodak Company, Rochester, N.Y.
No Drawing. Original application Nov. 13, 1967, Ser. No.
682,530. Divided and this application July 15, 1970,
Ser. No. 62,750
Int. Cl. C09h 7/00
U.S. Cl. 106—125          5 Claims

ABSTRACT OF THE DISCLOSURE

Compositions comprising a hardenable colloid and a hardening amount of a low molecular weight, nonwandering compound having the structural formula:

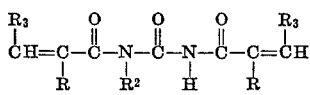

wherein each R is hydrogen, an aliphatic or aromatic radical, and $R^2$ and each $R_3$ are hydrogen or a lower alkyl radical.

---

This is a division of application Ser. No. 682,530, filed Nov. 13, 1967, now abandoned.

BACKGROUND OF THE INVENTION

Field of the invention

This invention relates to new and novel nonwandering compounds useful for hardening natural and synthetic materials, such as polymers, without after-hardening. In one aspect the invention relates to photographic silver halide emulsions comprising gelatin hardened by said compounds.

Description of the prior art

The use of a natural polymer such as gelatin, alone and in combination with synthetic polymers as vehicles, particularly for photographic purposes, often requires treatment with a succession of aqueous baths of variable pH or of increased temperature. Much work has already done in treating natural and synthetic polymers to improve their resistance to water so that swelling and melting do not occur upon treatment thereof with aqueous solutions in processing operations or in hot drying. Various compounds have previously been found useful for treating photographic binders containing gelatin, for example, so as to prevent swelling or melting during processing.

Metallic salts, for instance, such as those of chromium, aluminum, and zirconium tend to react and harden gelatin so very quickly that their addition, before shaping, in quantities required to achieve the desired hardening, involves the risk of premature coagulation of the gelatin solution.

Aldehydes such as formaldehyde are partly volatilized when drying materials containing them so that an accurate dosage is difficult to realize. Diketones of the 1,2-, 1,4-type, among which group the quinones might be considered members, tend to cause loss of speed of a photographic emulsion upon storage.

Many of the known hardeners act slowly so that a long period of time is necessary to attain a sufficiently stabilized state of hardening. As a consequence, the development properties and sensitometric characteristics of a photographic emulsion layer containing these changes in a manner which cannot be controlled. This undesirable effect is designated as "after-hardening" and is particularly detrimental because, as the layer continues to harden during storage, its permeability to processing solutions decreases. This causes inadequate development and adversely affects the speed of the photographic layer.

Other hardeners exert their hardening action not only upon material in which they are placed but wander or migrate into adjacent hardenable material, e.g., adjacent photographic layers, causing unwanted or undesirable effects.

Still other hardeners require strong heating to produce a sufficient degree of hardening. Strong heating is undesirable in the case of photographic silver halide gelatin emulsions and layers since it may easily lead to a reduction in sensitivity and formation of fog.

Certain other simple organic hardeners require a high molecular weight ballast in order to render them nondiffusible which often causes adverse physical characteristics to the photographic emulsion and results in a low and ineffective ratio of active hardening groups to ballast groups.

None of these latter cited compounds are without after-hardening properties. In other words, these compounds slowly continue to harden toward their maximum degree upon incubation.

Accordingly, it is an object of this invention to provide a new class of compounds exhibiting excellent hardening properties.

Another object of this invention is to provide hardening compounds which neither adversely affect the physical and photographic properties of natural or synthetic materials, particularly polymers, nor wander and after-harden.

Another object of the invention is to provide improved photographic elements and emulsions.

Yet another object of this invention si to provide a class of simple organic hardeners which do not require ballast groups in order to make them nonwandering.

Still another object is to provide improved photographic elements comprising a layer hardened by these new compounds.

Another object of this invention is to provide a means for hardening a hardenable material without undesirable after-hardening.

Other objects of this invention will become apparent from an examination of the specification and claims which follow.

SUMMARY OF THE INVENTION

I have now found that hardenable natural and synthetic materials can be hardened and rendered resistant to the effects of aqueous solutions, even at elevated temperatures, by a new class of compounds. These hardening compounds are of low molecular weight and comprise unsaturated diacyl groups joined together through an intervening nitrogen-containing bivalent moiety. These compounds harden polymers such as gelatin or primary amine-containing synthetic compounds in various forms such as solutions, emulsions, layers or the like in a rapid, well-controlled manner without undesirable after-hardening.

DESCRIPTION OF THE PREFERRED
EMBODIMENTS

One embodiment of my invention relates to a new and novel class of compounds having the structural formula:

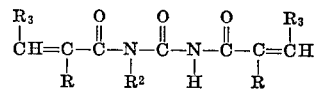

where each R is hydrogen, an aliphatic or aromatic radical, and $R^2$ and each $R_3$ are each hydrogen or lower alkyl radical.

Another embodiment relates to a method of hardening a layer comprising hardenable material which comprises incorporating a hardening compound of the above general formula into said layer.

Still another embodiment relates to a photographic element comprising a support and a layer hardened by a compound of the above general formula.

The new and novel compounds described herein possess good hardening properties when contacted with hardenable materials in any form such as in solution, emulsion or layer form. Although preferably mixed with or added to said polymers in emulsions, they are added in any other suitable manner with similarly good results.

The compounds of this invention are of a low molecular weight generally being in the range of about 168 and about 400, preferably less than about 320. They are comprised of two aliphatic, ethylenically-unsaturated radicals, for example, acryloyl or crotyl, linked together through an intervening carbonyl nitrogen-containing bivalent moiety such as urea. The said radicals can be further substituted as shown in the foregoing formula by lower alkyl groups, e.g., methyl, ethyl, propyl, butyl, and the like. This bivalent moiety can contain substituents on a nitrogen atom. Suitable substituents include lower alkyl radicals, such as, methyl, ethyl, propyl, isopropyl, butyl, and the like. The ethylenically unsaturated radicals can be unsubstituted in the alpha position to the carbonyl group or can contain substituents such as lower alkyl, e.g., alkyl of from 1 to 8 carbon atoms and preferably those of 1 to 4 carbon atoms, such as, methyl, ethyl, propyl, isopropyl butyl, and the like, or an aromatic group such as aryl and the like, for example, a phenyl group.

The compounds of this invention, all of which have been found to be especially useful in the hardening of compositions of matter comprising gelatin in accordance with my invention, can be used in any suitable hardening concentration, including, for example, concentrations of from about 0.5 to 10 percent based upon the weight of the hardenable material, e.g., dried gelatin, and more preferably in the range from about 0.67 to 3 percent. These compounds are particularly useful in hardening photographic silver halide emulsions comprising gelatin, as for example, in layers. Thus, as shown by Example II, these new compounds are decidedly good photographic hardeners, giving excellent results in both fresh and incubated samples.

These compounds may be combinated directly in the emulsion during its preparation or, in a photographic application the already prepared emulsion may be treated during its processing by said compounds in the form of various baths and solutions such as an acid-fixing bath. Although not readily water-soluble in high concentrations, these compounds are useful in aqueous acid solutions in a wide range of concentrations.

The new compounds described in this invention can be prepared by the reaction of an unsaturated acyl isocyanate, for example, acrylolyl isocyanate, with an acrylamide. The presence of a free-radical polymerization inhibitor is desirable and useful examples are m-dinitrobenzene, p-dimethylaminoanisole, and the like. These inhibitors will not react with the isocyanate since they do not contain active hydrogen atoms and they may be used in any concentration sufficient to prevent unwanted polymerization. The compounds of this invention can also be prepared in other ways, for example, by the reaction between a haloacylisocyanate with an amide and the subsequent dehydrohalogenating of the reaction product. Further, as shown by Examples IA and IB it is also possible to prepare these new compounds according to known methods by foregoing the step of isolating the intermediate acryloyl isocyanate prior to reaction with the acylamine.

Suitable solvents which can be used in the aforementioned reactions include 1,2-dichloroethane, chloroform, trichloroethane, and the like, but any such inert organic solvent can be satisfactorily used, provided it has a low boiling range (60–100° C.) in order to prevent polymerization of the acrylic moieties. The use of catalysts is optional.

All such reactions are conducted in the presence of the desired organic solvents at moderate temperatures and the reactions are not pressure dependent, and consequently, superatmospheric or subatmospheric pressures can be employed. As is obvious to one skilled in the art, the specific reaction conditions, for example, temperature, pressure, and the like depend upon the particular reactants used.

The compounds described in this application can be used effectively in combination with hardenable materials in general but they are most advantageously used with natural or synthetic polymers used as vehicles or binders in preparing photographic elements. Specific materials which can be hardened according to the practice of this invention include hardenable materials such as polymers, for example, gelatin, colloidal albumin, proteins, dispersed polymerized vinyl compounds, particularly those which increase the dimensional stability of photographic materials as exemplified by amine-containing polymers of alkyl acrylates, methacrylates, acrylic acid, sulfoalkyl acrylates or methacrylates, maleic acid, and the like.

The hardening agents described herein can be used in various kinds of photographic emulsions. In addition to being useful in orthochromatic, panchromatic, and infrared emulsions, they are also useful in X-ray and other non-spectrally sensitized emulsions. They can be added to the emulsions before or after the addition of any spectral sensitizing dyes which may be used. They are effective in sulfur and gold sensitized silver halide emulsions.

The materials hardened in the practice of this invention can be coated on a wide variety of supports. Typical supports include those generally employed for photographic elements, as exemplified by cellulose nitrate film, cellulose acetate film, polyvinyl acetal film, polystyrene film, polyethylene terephthalate film, and related films of resinous materials as well as glass, paper, metal, wood, and the like. Supports such as paper that are coated with α-olefin polymers, particularly polymers of α-olefins containing 2–10 carbon atoms, as for example, polyethylene, polypropylene, ethylene butene copolymers, and the like, can also be employed.

In addition to the hardening agents disclosed herein, photographic emulsions and elements can also contain additional additives, particularly those known to be beneficial in photographic emulsions, as exemplified by spectral sensitizers, speed increasing materials, other hardeners, plasticizers, and the like.

The emulsions hardnened by my new compounds can be used in photographic elements intended for color photography and thus may contain color-forming couplers or used as emulsions to be developed by solutions containing couplers or other color-generating materials or emulsions of the mixed-packet type.

The silver halides employed in the photographic emulsions include any of the photographic silver halides as exemplified by silver bromide, silver iodide, silver chloride, silver chlorobromide, silver chloroiodide, and the like. The silver halides used can be those which form latent images predominantly on the surface of the silver halide grains or those which form latent images inside the silver halide grains.

Hardened emulsions obtained in accordance with this invention employing gelatin or other hardenable hydrophilic colloids may be used in diffusion transfer materials. In one form of this process the undeveloped silver halide is complexed in non-image areas of the negative to form a water-soluble compound which is permitted to diffuse to a receiving layer in which said compound precipitates out as a positive metallic silver image. In other diffusion transfer processes, the final image is produced by diffusion of the developer, oxidized developer, coupler or dye, from the exposed and developed light-sensitive layer to a second layer in close proximity thereto. It is particularly advantageous to employ the hardeners of this invention with hardenable substances or in systems comprising emulsions, layers or solutions of hardenable matter where the absence of wandering and/or after-hardening is advantageous.

This invention can be further illustrated by the following examples of preferred embodiments thereof although it will be understood that these examples are included merely for purposes of illustration and are not intended to limit the scope of the invention unless otherwise specifically indicated.

EXAMPLE I.—PREPARATION OF N,N'-DIACRYLOYLUREA 9.7 parts of acryloyl isocyanate is added to 10 parts of acrylamide and 0.5 part of m-dinitrobenzene in 100 parts of 1,2-dichloroethane. This mixture is refluxed under nitrogen for over 15 hours. The acryloyl isocyanates are well known and previously described by Lieser and Kemner in Ber. 84, 1 (1951). A small amount of solid precipitate is filtered from the hot resulting solution. The filtrate is cooled at about —20° C. The resulting precipitated product is collected on a filter and dried under vacuum. The resulting crude, dry solid [(11 parts) having an M.P. of 111–130° C.] is tumbled with 200 parts of water for about an hour, collected on a filter and vacuum dried. This dry solid is then dissolved in 125 parts of boiling 1,2-dichloroethane with rapid stirring. After filtration and cooling, the solid product is collected on a filter and dried to yield 7 parts of final product having an M.P. of 142°–144° C.

(A) N-acryloyl-N'-methacryloylurea 4.5 parts of acrylyl chloride is added dropwise, under nitrogen over a period of about 1 hour, to a stirred, ice cooled suspension of 15 parts of silver cyanate and 0.2 part of m-dinitrobenzene in 50 parts of 1,2-dichloroethane. The mixture is allowed to reach ambient temperature and stirred 15 hours.

The mixture is then centrifuged to remove suspended matter and to the supernatant is added 4 parts of recrystallized methacrylamide and 0.2 part of m-dinitrobenzene. This mixture is heated to boiling on a steam pot with stirring under nitrogen. Heating is contained for 4 hours. This mixture is filtered hot and cooled in a freezer for about 15 hours. The resulting solid is filtered, washed, and vacuum dried. The dry solid is tumbled with 20 parts of water, filtered, and vacuum dried. The white dry solid is recrystallized from 3 parts 1,2-dichloroethane containing 0.02 part dinitrobenzene in a yield of 0.4 part and has a melting point of 130–133° C.

(B) N-methyl-N,N'-diacryloylurea

A mixture of 50 parts of 1,2-dichloroethane, 15 parts of silver cyanate and 0.1 part of n-dinitrobenzene is stirred in ice-bath under nitrogen while 4.5 parts of acrylyl chloride is added dropwise over a period of one hour. This mixture is stirred for 15 hours at ambient temperature and is then filtered.

The filtrate is treated with 4.2 parts of N-methyl acrylamide and 0.2 part of m-dinitrobenzene and then heated 6 hours on a steam bath under nitrogen before being filtered hot. Cooling for 15 hours in a freezing compartment gave no precipitation. The solution is evaporated to dryness on a Rinco apparatus and the resulting viscous residue cooled in a freezing unit where it partially solidifies. The precipitate is filtered and tumbled with 2.5 parts of water. The insoluble material is filtered off and vacuum dried. It is recrystallized from hot hexane yielding 0.2 part of a light yellow solid with a melting point of 175–177° C.

EXAMPLE II

As previously indicated, the compounds described herein give very good results when used as hardening agents in photographic applications. As illustrative of this, the compound of Example I is added to bone gelatin at a concentration of 1 percent based on the weight of gelatin and the resulting solution coated onto a polyester [poly(ethylene terephthalate)] film support. A control sample containing no hardener is also prepared.

A sample of each film coating was tested for hardness both fresh and after 3 days' incubation at 120° F., 50 percent relative humidity, by immersing in Kodak DK–50 developer at 25° C., for 3 minutes. The percent swell of the gelatin layer is calculated therefrom, and the results clearly indicate that hardening is effective, rapid, and controlled as follows:

| Film coating | Concentration based on weight of gelatin, percent | Percent swell fresh | 3 days upon incubation |
|---|---|---|---|
| No hardener | 0 | 1,300 | 1,210 |
| N,N'-diacryloylurea | 1 | 530 | 535 |

EXAMPLE III

In order to show further the effectiveness of these compounds such as that of Example I, a small amount of the hardener is added to a high-speed photographic silver bromoiodide emulsion. This is panchromatically sensitized with a cyanine dye. The example and control containing no hardener are coated on a polyester [poly(ethylene terephthalate)] film support at a coverage of 340 mg. of silver and 772 mg. of gelatin per square foot. Each sample is then tested for hardness as in Example II with the following results:

| Film coating | Concentration based on weight of gelatin, percent | Percent swell fresh | After 3 days' [1] |
|---|---|---|---|
| No hardener | 0 | 965 | 870 |
| N,N'-diacryloylurea | 1 | 490 | 470 |

[1] Incubation at 120° F., 50% relative humidity.

EXAMPLE IV

N - acryloyl-N'-methacryloylurea and N-methyl-N,N'-diacryloylurea are tested as hardeners by the procedure described in Example III except that the samples are immersed in water rather than developer. The results are as follows:

| Film coating | Concentration based on weight of gelatin, percent | Percent swell [1] |
|---|---|---|
| No hardener |  | 720 |
| N-acryloyl-N'-methacryloylurea | 1 | 550 |
| Do | 3 | 470 |
| Do | 6 | 360 |
| No hardener |  | 590 |
| N-methyl-N,N'-diacryloylurea | 1 | 290 |
| Do | 3 | 210 |
| Do | 5 | 190 |

[1] In water after 3 days' incubation at 120° F. and 50% relative humidity

EXAMPLE V

As already pointed out, the compounds of this invention have substantially no adverse sensitometric effects on a photographic emulsion while exhibiting favourable hardening and nonwandering characteristics. To illustrate, the compound of Example I is added to separate portions of a photographic emulsion as described in Example II.

For comparison purposes similar samples are coated using the following hardeners:

formaldehyde, a known hardener used in its optimum concentration;

N,N'-bis(chloroacetyl)urea, disclosed in British Pat. 990,275 (Gevaert), Apr. 28, 1965;

N-acryloyl-N'-chloroacetyl urea, a mixed function hardener; and

Methylenebisacrylamide, disclosed in British Pat. 994,869 (Kodak), June 10, 1965.

Each of these hardening compounds is added in optimally effective hardening concentrations, to separate portions of a photographic emulsion of the type described in Example II. Samples of each coating are tested for hardness as described in Example II.

In addition, a record sample of each coating is exposed on an Eastman IB sensitometer, processed for five minutes in Kodak DK–50 developer, fixed, washed and dried. These results are recorded as follows:

from 70° F. to 140° F. The water is sprayed over the element facilitating easy removal which is finally accomplished by simply peeling off the unhardened gelatin layer by moderate pressure along the element. This demonstrates that the hardener remained only in the layers in which it was placed, failing to migrate into the unhardened or nonhardened layers, the removal of which was easily accomplished because of their relative softness.

Similar results are obtained when the hardeners described herein are employed in photographic emulsions using a mixed vehicle or binder of synthetic polymer along with gelatin. For example, one such vehicle uses 3 parts of polymer and 1 part of gelatin by weight wherein the polymer is a copolymer composed of 80% ethylacrylate and 20% acrylic acid and is coated at 500–1000 mg. per square foot. In another vehicle the copolymer consists of 90% butylacrylate and 10% acrylic acid in place of the 80/20 ethyl-acrylate-acrylic acid copolymer.

From the foregoing examples, it can be seen in part

|  |  | Percent swell |  | Sensitometric results |  |  | After 2 weeks incubation |  |  |
|---|---|---|---|---|---|---|---|---|---|
| Hardener | Percent concentration [1] | Fresh | After 2 weeks [2] | Relative speed | Y | Fog | Relative speed | Y | Fog |
| Control (none) | | 965 | 870 | 100 | 1.30 | 0.07 | 107 | 1.09 | 0.06 |
| N,N'-diacryloylurea | 1 | 490 | 470 | 102 | 0.92 | 0.10 | 118 | 0.97 | 0.12 |
| Formaldehyde | 0.5 | 380 | 430 | 80 | 0.98 | 0.05 | 85 | 0.80 | 0.06 |
| N-acryloyl-N'-chloroacetylurea | 3 | 650 | 530 | 112 | 1.12 | 0.09 | 112 | 0.97 | 0.12 |
| N,N'-bis (chloroacetyl)-urea | 10 | 390 | 520 | 129 | 1.22 | 0.08 | 89 | 1.35 | 0.08 |
| Methylenebisacrylamide | 1 | 1,000 | 650 | 129 | 1.43 | 0.08 | 107 | 0.88 | 0.08 |

[1] Based on weight of hardenable material.
[2] Incubation at 120° F., 50% relative humidity.

EXAMPLE VI

In order to demonstrate the nonwandering characteristics of the compounds of this invention, 6% by weight of N,N'-diacryloylurea is added to a gelatin solution and is coated out as a layer on a cellulose acetate film support containing physical development nuclei. Coincidental to this layer is placed an additional interlayer of gelatin, similarly hardened by the above compound. These two layers on the support are then incubated for 3 days at about 70° F. and 50% relative humidity. Additional layers of gelatin are added, one with silver bromoiodide in an unhardened gelatin emulsion and, superimposed thereon, another nonhardened protective gelatin layer. These multilayer coatings are freshly prepared. After two weeks' incubation at 120° F., and 50% relative humidity, the coatings are exposed and processed in a standard silver solvent transfer monobath by immersing the coatings for 20 seconds in the monobath having a temperature of about 90° F. and the following formula:

| | |
|---|---|
| Water ml | 700.0 |
| Sodium Sulfite (anhydrous) g | 60.0 |
| Sodium carbonate (monohydrate) g | 21.6 |
| 4,4-dimethyl-1-phenyl-3-pyrazolidone g | 2.5 |
| Hydroquinone g | 10.0 |
| Sodium thiosulfate (pentahydrate) g | 65.0 | pH is adjusted to 11.0 to 11.1 with 45% KOH (7,-13 - diethianonadecane - 1,19 - bis-pyridinium-p-toluenesulfonate) g — 0.6

Water to equal 1.0 liter.

This step is followed by washing off the unhardened layers for about 10 to 30 seconds in water having a temperature of about 120° F., although the wash can vary that the new class of low molecular weight hardeners of this invention possesses good hardening properties in a low concentration when added to hardenable material such as polymeric compounds like gelatin or synthetic polymers, alone or in combination with each other. Further, these new hardeners exert their hardening effect rapidly without adverse after-hardening and with substantially no adverse sensitometric effect. Because they are non-wandering and can selectively harden the various layers of hardenable materials in which they are incorporated, they are particularly useful in photographic elements and similar systems.

Although this invention has been described in considerable detail with particular reference to certain preferred embodiments thereof, variations and modifications can be effected within the spirit and scope of the invention as described hereinbefore and as defined in the appended claims.

I claim:

1. A hardenable composition comprising a colloid, containing amino groups, and a hardening concentration of a compound having the structural formula:

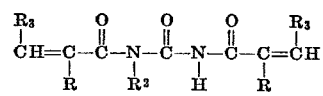

wherein each R is hydrogen, an aliphatic or aromatic radical, and $R^2$ and each $R_3$ are each hydrogen or a lower alkyl radical.

2. The composition of claim 1 in which said hardenable colloid containing amino groups comprises gelatin and said hardening compound is present in a concentration sufficient to harden said gelatin.

3. A composition of matter comprising gelatin, and, in a concentration sufficient to harden said gelatin, N,N-diacryloylurea.

4. A composition of matter comprising gelatin, and, in a concentration sufficient to harden said gelatin, N-acryloyl-N'-methacryloylurea.

5. A composition of matter comprising gelatin, and, in a concentration sufficient to harden said gelatin, N,N'-diacryloyl-N-methylurea.

References Cited

FOREIGN PATENTS

| | | | |
|---|---|---|---|
| 994,869 | 6/1965 | Great Britain | 96—111 |
| 851,339 | 10/1952 | Germany. | |

NORMAN G. TORCHIN, Primary Examiner

J. WINKELMAN, Assistant Examiner

U.S. Cl. X.R.

96—111